United States Patent [19]

Bjerklund et al.

[11] Patent Number: 5,067,507

[45] Date of Patent: Nov. 26, 1991

[54] LIQUID PROPORTIONER APPARATUS AND METHOD

[75] Inventors: Gunnar Bjerklund, Rolling Meadows; William C. Ore, Elmhurst; Casimir Pulawski, Chicago; Luigi Notardonato, Park Ridge, all of Ill.

[73] Assignee: Universal Beverage Equipment, Inc., Willowbrook, Ill.

[21] Appl. No.: 653,719

[22] Filed: Feb. 11, 1991

[51] Int. Cl.$^5$ .......................................... G05D 11/035
[52] U.S. Cl. ............................................ 137/3; 137/88; 137/209; 137/263
[58] Field of Search .................. 137/3, 7, 88, 209, 263

[56] References Cited

U.S. PATENT DOCUMENTS

| | | | |
|---|---|---|---|
| 1,936,538 | 11/1933 | Borden | 137/3 |
| 3,298,383 | 1/1967 | Cooper | 137/88 X |
| 3,743,141 | 7/1973 | Mnilk | 137/602 X |
| 4,669,496 | 6/1987 | Kemp | 137/209 |

Primary Examiner—Robert G. Nilson
Attorney, Agent, or Firm—Wood, Phillips, Mason, Rectenwald & Van Santen

[57] ABSTRACT

A proportioner apparatus is capable of proportioning and admixing at least two liquids at relatively low pressures. The proportioner apparatus has a pressurizable reservoir for each liquid and a mix reservoir. A fluid communication conduit provides fluid communication between the interior of the mix reservoir and the interior of the liquid reservoirs. The liquid reservoirs are pressurized with a pressurizing gas to cause flow from the liquid reservoirs into the mix reservoir. A discharge conduit of the mix reservoir discharges admixture therefrom. When flow ceases in the discharge conduit the flow into the mix reservoir is also stopped as by shutoff valves in the fluid communication conduit. The proportioner apparatus can also include a pump operably associated with the discharge conduit to enhance admixture flow to a pressurizable tank that holds the admixture for further downstream processing. The pressure downstream of the pump is usually higher than the pressure upstream of the pump.

16 Claims, 1 Drawing Sheet

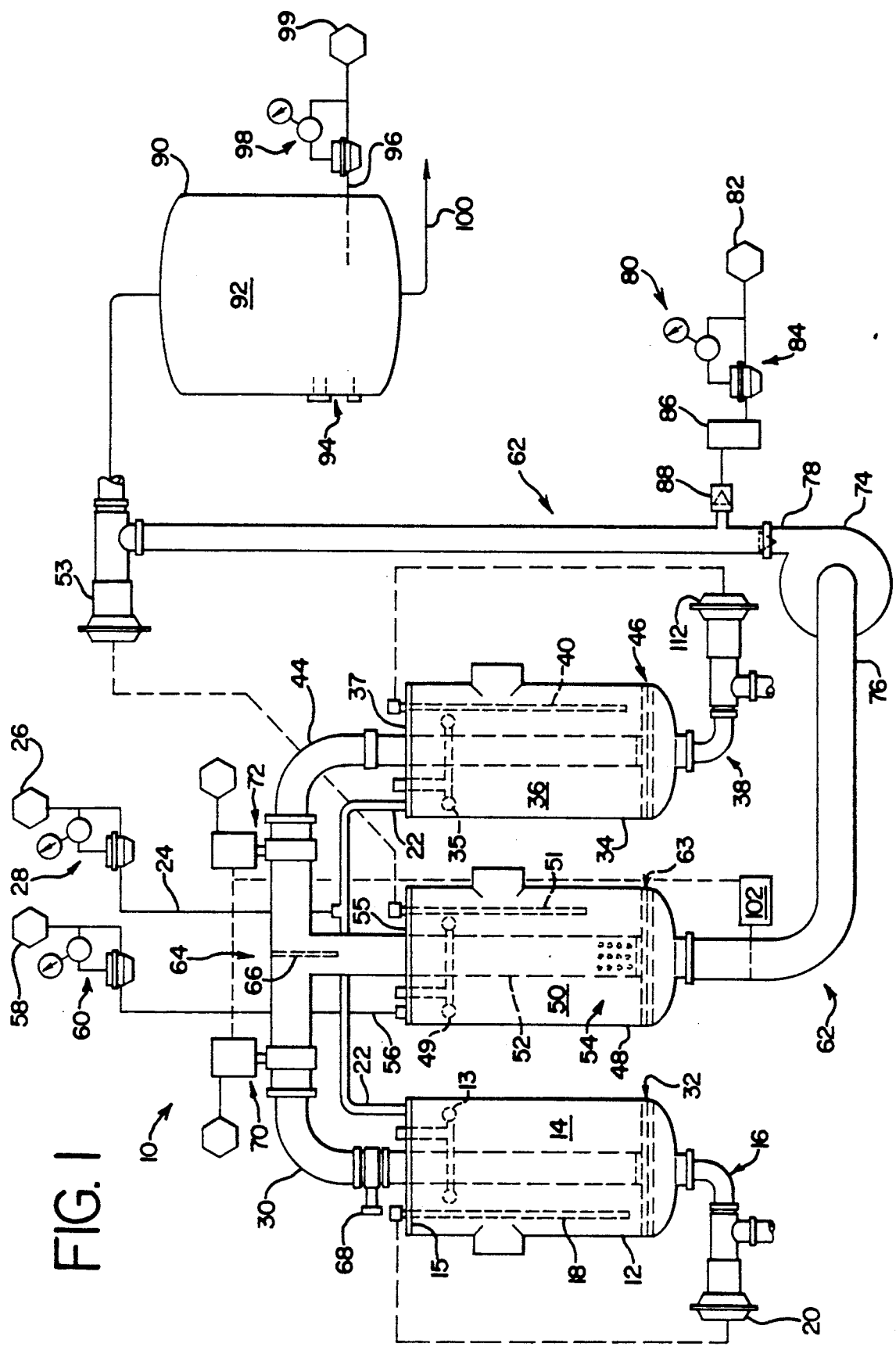
FIG. I

LIQUID PROPORTIONER APPARATUS AND METHOD

TECHNICAL FIELD

The present invention relates to a proportioner apparatus and a method for proportioning and admixing at least two liquids and in particular relates to an apparatus and method that accomplishes proportioning and admixing at relatively low pressures.

BACKGROUND OF THE INVENTION

Apparatus for admixing liquid components in a predetermined proportion (ratio) are known, especially in the carbonated beverage industry Some of these apparatus provide various liquid components to a mixing chamber from either supply conduits or supply vessels. Each supply conduit or vessel is associated with a separate pump that draws the liquid component from the conduit or vessel and introduces it into the mixing chamber. The various liquid components are admixed together in the mixing chamber and the resulting admixture can be delivered therefrom to other processing stations such as bottling stations. Unfortunately, such apparatus are complicated in that they require an individual pump to be associated with each supply conduit or vessel. Furthermore, variations in the pumping capacity, which can be caused by fluctuations in the electrical current supply, different liquid flow conditions or the like, can cause substantial variations in the ratio of the liquid components in the admixture which is highly undesirable.

Another known apparatus provides a mixing chamber into which the supply conduits discharge the various liquid components to be admixed. The admixture is discharged from the mixing chamber through a discharge conduit. Control devices are provided in the mixing chamber which are operably associated with valves provided in the supply conduits to regulate the quantity of liquid components that can flow into the mixing chamber from the respective conduits. When the mixing chamber is filled these devices control the discharge of the resulting admixture by means of a pump. Unfortunately, for each different ratio of liquid components, a separate control device must be provided. Thus, when the ratio is to be changed the control devices must be changed which is not only time-consuming but also is expensive in terms of down time of the apparatus, labor required to make the change and the necessity to keep a variety of different control devices on hand.

U.S. Pat. No. 3,743,141 to Mnilk et al. discloses a mixing apparatus for liquids that includes supply vessels that contain the liquid components to be mixed. The liquid components are supplied to the mixing chamber via gravity feed and throttling devices. Thus, the ratio of the liquid components achieved using this apparatus is dependent upon not only gravity but the hydrostatic head in the supply vessels that can change as liquid component is supplied thereto or removed therefrom. That is, the amount and weight of the liquid component in the vessels and the height the vessels are above the throttling device affect the ratio of the liquid component. Such a system is difficult to control. Furthermore, if the viscosities of the liquid components differ by a large amount additional difficulties can arise in obtaining the proper ratio.

U.S. Pat. No. 4,669,496 to Kemp et al. discloses a liquid proportioner having a water chamber and a syrup chamber in communication with a mixing chamber from which the combined liquid is displaced to a tank. The water and syrup chambers are pressurized with a gas to force the fluids into the mixing chamber and thereby into the tank. The pressure in the tank is relatively high. Therefore, the pressure within the water, syrup, and mix chambers must be higher than the pressure within the tank into which the combined liquid flows. Thus, the entire proportioner of Kemp operates at a relatively high pressure and uses a high pressure gas source. This proportioner undesirably requires the use of relatively expensive chambers, conduits and the like capable of withstanding the elevated pressure. Furthermore, the use of high pressure gas can be dangerous in the event of a leak.

Cleanliness is important because the mixture is consumed by people and therefore sanitary conditions must be maintained. Conventionally, baffles are welded in the chambers to assist in maintaining a nonturbulent condition therein. Unfortunately, the baffles, they cannot be removed, making cleaning of the baffles and chambers more difficult. Also, the weld itself is difficult to clean.

A proportioner apparatus and method capable of admixing liquids in an accurate ratio and at relatively low pressures is desired especially in the beverage industry. The proportioning apparatus of the present invention satisfies these desires.

SUMMARY OF THE INVENTION

The present invention is directed to a proportioner apparatus for proportioning and admixing at least two liquids and is especially useful in the carbonated beverage industry wherein water is admixed with a flavored liquid. The apparatus has a pressurizable reservoir for each liquid and a mix reservoir having a discharge conduit capable of discharging the admixed liquids therefrom. The interior of the mix reservoir is in fluid communication with the interior of each of the liquid reservoirs. The liquid reservoirs are pressurized with gas via a gas input conduit to cause the flow of their respective liquids therefrom into the mix reservoir. A system responsive to the flow within the discharge conduit controls the input to the mix reservoir from the liquid reservoirs. Preferably, all of the reservoirs can be opened as by removal of their top for ease of cleaning.

The discharge conduit can include a pump for enhancing flow from the mix reservoir. The pump can also assist in admixing the liquids. The inlet side of the pump is at a reduced pressure as compared to the outlet side of the pump. This pressure differential can be caused by the action of the pump or by the injection of carbonating gas at or downstream of the outlet side.

The apparatus can also include an optional pressurizable tank for receiving the admixture from the discharge conduit The tank holds the admixture to permit cooling of the admixture if its temperature has been elevated by admixing or the introduction of carbonating gas. The tank also holds the admixture for additional downstream processing such as bottling, dispensing or the like.

Fluid communication between the interiors of the reservoirs can be accomplished in one of two distinct ways. This can be accomplished by a single fluid communication conduit that at least partially admixes the liquids prior to introduction into the mix reservoir or multiple fluid communication conduits that do not admix the liquids prior to introduction into the mix reservoir. If the liquids are not admixed prior to introduction into the mix reservoir, the apparatus can include a conventional mixer device to provide admixing. The fluid conduits enter the reservoirs through lids on top of the reservoirs which are removable.

Preferably, baffles are affixed to the end of each conduit that is within the reservoirs to reduce the turbulence that can be created by the introduction of fluid into the reservoirs Thus, removal of the conduit from the reservoir results in removal of the baffle which facilitates cleaning of the baffle and reservoir that can result in an improvement in sanitary conditions.

The responsive system includes valves in the fluid communication conduit, or the gas supply conduit, that are opened or closed in response to a signal that the admixture is or is not flowing through the discharge conduit.

A probe within each reservoir senses the fluid level therein In response to a signal from the probe, a valve that controls the fluid supply to the liquid reservoirs, or admixture flow from the mix reservoir, is operated. The present invention permits the probe to be positioned lower in the reservoir and only slightly higher than the end of the fluid communication conduit. Such a configuration results in the capability to operate the reservoir with less fluid therein without blowing gas through the fluid communication conduit. Such an introduction of gas would adversely affect the composition of the admixture or the downstream processes. The capability to operate at lower fluid levels minimizes waste.

The desired ratio of the liquids can be achieved within the mix reservoir in an entirely unique manner while supplying the same gas pressure to both of the liquid reservoirs Liquid flow through the fluid communication conduit can be adjusted as by using an adjustable metering valve therein to achieve the desired ratio.

The pressure in the apparatus is relatively low upstream of the pump. Thus, the upstream section of the apparatus, e.g., the reservoirs, fluid communication conduit and the section of the discharge conduit upstream of the pump, operate at relatively low pressure, e.g., about 15 pounds per square inch (psi) or less However, the downstream section of the apparatus, e.g., the downstream section of the discharge conduit and the tank, operates at a higher pressure, e.g., about 60 to 75 psi more or less. The upstream section and the downstream section of the apparatus are isolated from each other in that the pressure in one section is independent of the pressure in the other section.

The use of this reduced pressure permits a significant section of the apparatus to be constructed using reservoirs, conduits, fittings, valves, gaskets, and the like that only have to withstand a relatively low pressure Thus, only a minor section of the apparatus requires the use of a tank, a conduit, valves, gaskets, and the like capable of withstanding a relatively high pressure. Furthermore, the use of low pressure gas permits the use of a low pressure gas source with its attendant benefits.

In operation, a liquid is introduced into each of the pressurizable liquid reservoirs. Pressurizing gas is also introduced into the liquid reservoirs to force the liquids into the mix reservoir upon demand when an admixture is being dispensed through the discharge conduit. When flow ceases in the discharge conduit, the system responsive to fluid flow within the discharge conduit suspends the input of liquid into the mix reservoir by closing valves associated with the liquid reservoirs. When flow in the discharge conduit starts again, the responsive system opens the valves.

When the admixture level in the mix reservoirs drops below a desired level, a signal is sent to a variable valve in the discharge conduit to reduce the size of the opening and thereby reduce the flow rate through the discharge conduit. When the admixture level is at its desired level, the valve is opened to increase the flow rate. Thus, the flow rate from the mix reservoir is dependent upon the flow rate in the discharge conduit and not the pressure in the discharge conduit.

The admixture supplied from the discharge conduit is substantially homogeneous and is of the desired proportion of liquids. Therefore, the admixture supplied to the tank is substantially homogenous. As will be appreciated, this will hold true regardless of any pressure fluctuations that may occur on the inlet or outlet side of the pump.

In accordance with another feature of the invention, one or more of the reservoirs can contain a clean-in-place cleaning system that permits the reservoir to be cleaned without being opened The reservoirs can be opened if desired which can facilitate cleaning.

The present invention is also directed to a method of proportioning and admixing at least two liquids. The method includes the steps of providing a pressurizable reservoir for each liquid, providing liquid in the liquid reservoirs, providing a mix reservoir having a discharge conduit for discharging admixture from the mix reservoir, providing fluid communication between the interior of the mix reservoir and the interior of each of the liquid reservoirs, and sensing the condition of the flow through the discharge conduit to generate a signal indicating whether or not there is flow in the discharge conduit. In addition, the method includes the step of responding to the signal to permit or suspend flow of liquids to the mix reservoir.

The present invention produces an admixture of liquids in the desired ratio and at a relatively low pressure without the aforementioned shortcomings of the prior art.

Numerous other advantages and features of the present invention will become readily apparent from the following detailed description of the preferred embodiment, the drawing and the appended claims.

BRIEF DESCRIPTION OF THE DRAWING

The drawing is a schematic representation of a preferred embodiment of a liquid proportioner apparatus in accordance with the present inventions.

DETAILED DESCRIPTION OF THE PREFERRED EMBODIMENTS

Although this invention is susceptible to embodiment in many different forms, there is shown in the drawing, and will be described in detail, a presently preferred embodiment of the invention. It should be understood, however, that the present disclosure is to be considered as an exemplification of the best mode incorporating the principles of this invention. On the other hand, this disclosure of the preferred embodiment is not intended to limit the invention in any manner whatsoever.

The present proportioner apparatus can be utilized to proportion and admix two or more liquids of like or different viscosities. This apparatus is particularly useful in the carbonated beverage industry wherein one liquid reservoir contains water and another liquid reservoir contains a flavored liquid that can be a syrup, concentrate or the like. For convenience, the present proportioner apparatus will be described herein as utilizing two liquids, i.e., water and flavored liquid. It will be understood, however, that the proportioner apparatus is useful in other industries and that more than two liquid reservoirs can be utilized.

A proportioner apparatus 10 includes a water reservoir 12 having an interior 14. Water is introduced into the reservoir 12 by a water inlet conduit 16. The water level in the reservoir 12 is sensed by a level control probe 18 that is operably associated with a water inlet control valve 20 that opens or closes to permit or suspend water flow in the inlet conduit 16 in response to a signal from the probe 18 that the water level is decreasing or is at the desired level. Preferably, the degree to which the valve 20 opens is variable to accommodate a wide range of flow requirements The water is provided by a source (not shown) and is preferably deaerated prior to introduction into the water reservoir 12.

The elements referred to herein as conduits can alternatively be pipes, lines or the like.

The water reservoir 12 has a gas input conduit 22 in fluid communication with the interior 14 that is capable of providing a pressurizing gas thereto. The gas is supplied to the gas input conduit 22 by a gas supply conduit 24 from a gas source 26. The gas pressure in the water reservoir 12 is controlled by pressure regulator 28.

The various pressurizing gas sources discussed herein can be a single gas source. Preferably, the gas used is carbon dioxide.

A water outlet standpipe 30 extends through a removable top 15 and is in fluid communication with the interior 14 of the water reservoir 12. Optionally, baffles 32 can be utilized. The baffles 32 are preferably attached over the input opening of the water outlet standpipe 30 and are positioned adjacent to the output opening of the water inlet conduit 16. The baffles 32 are perforated plates that help distribute the water from the water inlet conduit 16 to maintain a nonturbulent condition in the water reservoir 12. Preferably, the middle baffle has a centrally located deflecting disc (not shown) positioned above the output opening of the water inlet conduit 16 that deflects and smoothes the flow of water into the water reservoir 12.

The proportioner apparatus 10 also includes a flavored liquid reservoir 34 having an interior 36. Flavored liquid is supplied to the reservoir 34 by an inlet conduit 38.

The flavored liquid level in the reservoir 34 is sensed by a level control probe 40 that is operably associated with a flavored liquid inlet control valve 42 that opens or closes to permit or suspend flow in the inlet conduit 38 in response to a signal from the probe 40 that the flavored liquid level is decreasing or at the desired level. Preferably, the degree to which the valve 42 opens is variable to accommodate a wide range of flow requirements. The flavored liquid is provided by a source (not shown).

The gas input conduit 22 also supplies pressurizing gas to the interior 36 of the flavored liquid reservoir 34. Thus, the pressure in the water reservoir 12 and flavored liquid reservoir 34 is the same.

A flavored liquid outlet standpipe 44 extends through a removable top 37 and is in fluid communication with the interior 36 of the flavored liquid reservoir 34. Optionally, flavored liquid reservoir baffles 46 can be utilized. The baffles 46 are preferably attached over the input opening of outlet standpipe 44 and are positioned adjacent to the outlet opening of the inlet conduit 16. The baffles 46 are configured and function like the baffles 32.

The present invention permits the level control probe in a reservoir to be positioned near the bottom of the reservoir slightly above the end of the outlet standpipe. This feature is especially important with regards to the flavored liquid outlet standpipe 44 and the level control probe 40 due to the cost of the flavored liquid. By positioning both the end of the standpipe 44 near the bottom of the reservoir 34 and the probe 40 only slightly higher, more of the flavored liquid can be removed from the reservoir 34 without undesirably blowing gas through the standpipe 44. The more flavored liquid that can be removed from the reservoir 34, the less remains in the reservoir 34 which would have to be wasted when a change in flavored liquid was desired.

The proportioner apparatus 10 also includes a mix reservoir 48 having an interior 50. A mix reservoir inlet standpipe 52 extends through removable top 55 and is in fluid communication with the interior 50 and terminates in a lower section 54 that is apertured on the sides and bottom and which helps to evenly distribute the admixture to the mix reservoir 48. Additionally, the apertured lower section 54 contributes to the mixing. Turbulence within the inlet standpipe 52 can be increased to enhance admixing of the water and flavored liquid. Protrusions, angled planes and the like (not shown) can be present in the inlet standpipe 52 to increase the turbulence.

A pressurizing gas supply conduit 56 is in communication with the interior 50 of the mix reservoir 48 to provide gas thereto from a gas source 58. The pressure in the mix reservoir 48 is controlled by a gas pressure regulator 60.

The proportioner apparatus 10 also has a discharge conduit 62 from which the admixed liquid is discharged Operably associated with the discharge conduit 62 is a conventional flow sensor (not shown). Substantial homogeneity of the admixture can be achieved in the mix reservoir 48 and/or the discharge conduit 62.

Optionally, mix reservoir baffles 63 can be attached below the apertured lower section 54 and adjacent to the discharge conduit 62. The baffles 63 are configured and function like the baffles 32.

The admixture level in the mix reservoir 48 is sensed by a level control probe 51 that is operably associated with an admixture discharge control valve 53 that varies the opening of the valve 53 to increase or decrease the flow rate in the discharge conduit 62 in response to a signal from the probe 51 that the admixture level is increasing or decreasing. Thus, the apparatus is self-pacing because, as the admixture level in the mix reservoir increases or decreases, the admixture discharge flow rate simultaneously increases or decreases The flow rate from the mix reservoir 48 is dependent upon the flow rate in the discharge conduit 62 and not the pressure in the discharge conduit 62.

Fluid communication between the interior 50 of the mix reservoir 48 and the interior 14 of the water reservoir 12 and the interior 36 of the flavored liquid reservoir 34 is achieved by a fluid communication conduit 64 that includes the water outlet standpipe 30, the flavored liquid outlet standpipe 44 and the mix inlet standpipe 52. Preferably, a diverting baffle 66 is positioned at the intersection of these three standpipes to guide the liquids from the water outlet standpipe 30 and the flavored liquid outlet standpipe 44 into the mix reservoir inlet standpipe 52. Furthermore, it is presently believed that the diverting baffle 66 also creates turbulence to enhance admixing.

In an alternative embodiment that is not illustrated, a fluid communication conduit runs from each of the water and flavored liquid reservoirs to the mix reservoir. In this alternative embodiment, a conventional mixing device can be present in the mix reservoir to admix the water and flavored liquid.

The fluid communication conduit 64 can include a water shutoff valve 70 in the water outlet standpipe 30 and a flavored liquid shutoff valve 72 in the flavored liquid outlet standpipe 44. The shutoff valves 70 and 72 are operated simultaneously so that either both are open or both are closed. This system of controlling the flow of water and flavored liquid to the mix reservoir can be operated in response to a remote signal generated by the flow of admixture through the discharge conduit as will be discussed hereinbelow in conjunction with the operation of the apparatus.

In an alternative embodiment that is not illustrated, the responsive system can include valves in the gas input conduit 22 in each of the sections thereof that lead to the water reservoir 18 and flavored liquid reservoir 34 or a valve in the gas supply conduit 24. When a flow condition is sensed in the discharge conduit 62 the valves are opened to permit flow to the mix reservoir 48. When a no-flow condition is sensed the valves are shut to suspend the flow of water and flavored liquid to the mix reservoir 48.

The fluid communication conduit 64 can also include one or more valves to control the ratio of the two liquids. For example, the water outlet standpipe 30 can have an adjustable metering valve 68. Thus, while the flavored liquid flow through standpipe 44 remains constant the water flow through standpipe 30 can be adjusted using the metering valve 68. In this manner a wide range of ratios can be achieved.

In operation, the water reservoir 12 and the flavored liquid reservoir 34 (collectively referred to as the liquid reservoirs 12 and 34) contain their respective liquids. Pressurizing gas is introduced into the two liquid reservoirs 12 and 34 via the gas input conduit 22. The pressure is relatively low, i.e., about 15 pounds per square inch (psi) or less. The adjustable metering valve 68 is set so that the desired ratio of water and flavored liquid is achieved The shutoff valves 70 and 72 are open. The pressure within each of the liquid reservoirs 12 and 34 equalize to the pressure of the gas input conduit 22. Pressurization forces the water and flavored liquid from the water reservoir 12 and flavored liquid reservoir 34, respectively, into the water outlet standpipe 30 and the flavored liquid outlet standpipe 44, respectively. The water and the flavored liquid impinge upon the diverting baffle 66 and proceed into the mix reservoir inlet standpipe 52. Admixing of the water and flavored liquid occurs within the mix reservoir inlet standpipe 52. Further admixing occurs as the mixture exits the mix reservoir inlet standpipe 52 through the apertured bottom section 54.

The decrease in the water level in the water reservoir 12 is sensed by the water level control probe 18 which signals the water inlet control valve 20 to open to permit water to flow through the inlet conduit 16 and enter the water reservoir 12. When the desired level is achieved the valve 20 is closed to stop the flow of water.

The flavored liquid control probe 40, the flavored liquid inlet control valve 42, and the inlet conduit 38 of the flavored liquid reservoir 34 function in a similar manner.

The admixture can be discharged from the mix reservoir 48 through the discharge conduit 62. The mix reservoir 48 can be pressurized with gas to facilitate discharge of the admixture. This pressurizing gas is supplied by the gas supply conduit 56 at a pressure set by the gas pressure regulator 60. The gas pressure in the mix reservoir 48 is less than the gas pressure in the water reservoir 12 and the flavored liquid reservoir 34.

When the flow through the discharge conduit 62 stops, the flow from the water reservoir 12 and the flavored liquid reservoir 34 also stops. A system of stopping the flow from the reservoirs 12 and 34 includes the water shutoff valve 70 in the water outlet standpipe 30 and the flavored liquid shutoff valve 72 in the flavored liquid outlet standpipe 44. The system further includes the conventional sensor (not shown) operably associated with the discharge conduit 62 and the shutoff valves 70 and 72. The shutoff valves 70 and 72 can be closed in response to a signal generated by the sensor 102 when flow has ceased in the discharge conduit 62. When flow resumes in the discharge conduit 62, the sensor 102 recognizes this flow and signals the shutoff valves 70 and 72 to open. Opening of the shutoff valves 70 and 72 permit flow into the mix reservoir 48 from the liquid reservoirs 12 and 34.

Optionally, the proportioner apparatus 10 can further include a pump 74 that is part of the discharge conduit 62 to facilitate discharging of the admixture. Additional admixing can be performed by the pump 74. The pump 74 has an inlet (upstream) side 76 and an outlet (downstream) side 78. The pressure at the inlet side 76 preferably is lower than the pressure at the outlet side 78.

A preferred pump is a centrifugal pump which rotates at a constant speed but experiences slippage when the opening of the valve 53 is reduced. Slippage is a reduction in the throughput of a pump in response to an increase in pressure at the outlet side of the pump. Thus, the throughput of the pump is automatically adjusted and is based upon the degree the valve 53 is opened.

The proportioner apparatus 10 can include a carbonation system 80 on the outlet side 78 of the pump 74. The carbonation system 80 can include a carbonating gas supply 82, a pressure regulator 84, a gas flow meter 86, and a check valve 88 The preferred carbonating gas is carbon dioxide.

The proportioner apparatus 10 can also include a pressurizable tank 90 to receive the admixture or the carbonated admixture The tank 90 can include level sensors 94 that sense the admixture level in an interior 92 of the tank 90. The tank 90 can be pressurized by a pressurizing gas from a supply conduit 96. The pressure is controlled by a pressure regulator 98. The gas is supplied by a gas supply 99. An admixture discharge conduit 100 can supply the downstream operations with the admixture.

The tank 90 is useful to hold the admixture and permit the dissipation of any heat that may have been generated in the mixing process or by the introduction of the carbonating gas. Also, carbonating gas can be introduced into the admixture that is in the tank 90.

In operation, when the proportioner apparatus 10 includes the pump 74 and the pressurizable tank 90, an operation downstream of the tank 90 draws admixture through the discharge conduit 100 from the interior 92 of the tank 90 decreasing the level of the admixture in the tank 90 below a desired level. This decrease in admixture level is sensed by the level sensors 94 which activate the pump 74 resulting in admixture being supplied to the tank 90. The activation of the pump can result in a signal being sent to the shutoff valves 70 and 72 to instruct the shutoff valves 70 and 72 to open because there is flow in the discharge conduit 62. The section of the proportioner apparatus 10 upstream of the pump 74 operates as described previously.

When the admixture level in the tank 90 reaches the desired level the sensors 94 signal the pump 74 to stop pumping which in turn can signal the shutoff valves 70 and 72 to close because there is no flow in the discharge conduit 62.

Activation of the pump can signal the carbonation system 80 to supply carbonating gas. Deactivation of the pump 74 can signal the carbonation system 80 to be shut off.

Optionally, each of the reservoirs 12, 34 and 48 can have positioned therein cleaning devices 13, 35 and 49, respectively The cleaning devices 13, 35 and 49 are connected to a cleaning solution source (not shown) that can be an aqueous detergent solution Activation of the cleaning devices 13, 35 and 49 results in pressurized solution entering the respective reservoir to clean the same.

The present invention is also directed to a method of proportioning and admixing at least two liquids. The method includes the steps of providing a pressurizable reservoir for each liquid, providing liquid in the liquid reservoirs, providing a mix reservoir having a discharge conduit for discharging admixture therefrom, providing fluid communication between the interior of the mix reservoir and the interior of each of the liquid reservoirs, sensing the condition of the flow through the discharge conduit to generate a signal indicating whether or not there is flow in the discharge conduit, and providing a system responsive to the signal to permit or suspend flow of liquids to the mix reservoir.

The method can also include the steps of providing a pump operably associated with the discharge conduit, providing, downstream of the pump, a pressurizable tank in fluid communication with the discharge conduit, and pumping admixture through the discharge conduit and into the tank.

This invention has been described in terms of specific embodiments set forth in detail, but it should be understood that these are by way of illustration only and that the invention is not necessarily limited thereto. Modification and variations will be apparent from this disclosure and may be resorted to without departing from the spirit of this invention as those skilled in the art will readily understand. Accordingly, such variations and modifications of the disclosure are considered to be within the purview and scope of this invention and the following claims.

What is claimed is:

1. A proportioner apparatus for proportioning and admixing at least two liquids comprising:
    a pressurizable reservoir for each liquid;
    a mix reservoir having means for discharging the admixture from the mix reservoir;
    means for achieving fluid communication of the interior of the mix reservoir with the interior of each of the liquid reservoirs; and
    means responsive to a flow/no flow condition of the admixture in the admixture discharging means for controlling input to the mix reservoir from the liquid reservoirs.

2. The proportioner apparatus in accordance with claim 1 further comprising means for receiving and holding the admixture in fluid communication with the admixture discharging means.

3. The proportioner apparatus in accordance with 1 wherein the admixture discharging means comprises means for pumping admixture from the mix reservoir.

4. The proportioner apparatus in accordance with claim 1 wherein the responsive means comprises:
    means for sensing a flow/no flow condition in the admixture discharging means and generating a condition signal; and
    means for opening and closing the fluid communication means in response to the condition signal.

5. The proportioner apparatus in accordance with claim 1 further comprising:
    means for sensing the admixture level in the mix reservoir and generating a signal; and
    means for adjusting the flow rate in the discharging means in response to the level signal.

6. The proportioner apparatus in accordance with claim 1 wherein the fluid communication means comprises a fluid conduit in fluid communication with the interiors of each of the liquid reservoirs and the mix reservoir.

7. The proportioner apparatus in accordance with claim 1, further comprising at least one baffle over an opening of the fluid communication means that is attached thereto.

8. The proportioner apparatus in accordance with claim 1 further comprising means for admixing the liquids in the fluid communication means.

9. The proportioner apparatus in accordance with claim 1 further comprising a means for sensing the admixture level in the mix reservoir and a valve in the discharging means responsively associated with the level sensing means.

10. A proportioner apparatus for proportioning and admixing at least two liquids comprising:
    a pressurizable reservoir for each liquid;
    a mix reservoir having means for discharging the admixture from the mix reservoir;
    the discharge means comprising a means for pumping the admixture from the mix reservoir;
    means for achieving fluid communication of the interior of the mix reservoir with the interior of each of the liquid reservoirs;
    means for receiving and holding the admixture in fluid communication with the discharge means; and
    means responsive to a flow/no flow condition of the admixture in the admixture discharging means for controlling input to the mix reservoir from the liquid reservoirs.

11. The proportioner apparatus in accordance with claim 10, further comprising at least one baffle over an opening of the fluid communication means that is attached thereto.

12. The proportioner in accordance with claim 10 further comprising:
    means for sensing the admixture level in the mix reservoir and generating a level signal; and
    means for adjusting the flow rate a valve in the discharging means in response to the level signal means.

13. A method of proportioning and admixing at least two liquids comprising the steps of:
- providing a pressurizable reservoir for each liquid;
- providing liquid in the liquid reservoirs;
- providing a mix reservoir having means for discharging the admixture from the mix reservoir;
- providing means for achieving fluid communication between the interior of the mix reservoir and the interior of each of the liquid reservoirs;
- sensing a flow/no flow condition in the admixture discharging means to generate a condition signal indicating whether or not there is flow; and
- providing means responsive to the condition signal for permitting or suspending the flow of liquids to the mix reservoir.

14. The method in accordance with claim 13 further comprising the steps of:
- providing means for pumping admixture through the discharge conduit;
- providing, downstream of the pumping means, means for receiving and holding the admixture in fluid communication with the discharge conduit; and
- pumping admixture through the discharge conduit and into the receiving and holding means.

15. The method in accordance with claim 14 wherein the pressure in the liquid reservoirs, the mix reservoir, the fluid communication means and the discharge means upstream of the pump is less than the pressure in the discharge means downstream of the pump and in the receiving and holding means.

16. The method in accordance with claim 13 further comprising the steps of:
- sensing the level of the admixture in the mix reservoir;
- generating a signal based on the sensed level; and
- varying the flow rate through the discharging means in response to the signal.

* * * * *